(12) United States Patent
Vadapandeshwara et al.

(10) Patent No.: US 11,714,677 B2
(45) Date of Patent: Aug. 1, 2023

(54) MATERIALIZATION OF AN ANALYTICAL WORKSPACE

(71) Applicant: Oracle Financial Services Software Limited, Mumbai (IN)

(72) Inventors: Rajaram Narasimha Vadapandeshwara, Bangalore (IN); Tara Nandakishore Kant, Patna (IN)

(73) Assignee: Oracle Financial Services Software Limited, Mumbai (IN)

( * ) Notice: Subject to any disclaimer, the term of this patent is extended or adjusted under 35 U.S.C. 154(b) by 58 days.

(21) Appl. No.: 17/333,738

(22) Filed: May 28, 2021

(65) Prior Publication Data

US 2022/0043671 A1 Feb. 10, 2022

(30) Foreign Application Priority Data

Aug. 7, 2020 (IN) .............................. 202041033832

(51) Int. Cl.
*G06F 11/36* (2006.01)
*G06F 9/48* (2006.01)
(Continued)

(52) U.S. Cl.
CPC .............. *G06F 9/4843* (2013.01); *G06F 8/35* (2013.01); *G06F 16/245* (2019.01);
(Continued)

(58) Field of Classification Search
CPC .. G06F 9/4843; G06F 16/245; G06F 16/2379; G06F 16/24573; G06F 8/35; G06F 21/6218
See application file for complete search history.

(56) References Cited

U.S. PATENT DOCUMENTS

| 9,348,888 | B1* | 5/2016 | Labaj | ..................... G06F 16/289 |
| 2005/0234688 | A1* | 10/2005 | Pinto | ...................... G05B 17/02 |
| | | | | 703/13 |

(Continued)

OTHER PUBLICATIONS

Gianpaolo Coro et al., Cloud Computing in a Distributed e-infrastructure Using the Web Processing Service Standard, 2017, [Retrieved on 2023-22]. Retrieved from the internet: <URL: https://onlinelibrary.wiley.com/doi/epdf/10.1002/cpe.4219> 16 Pages (1-16) (Year: 2017).*

(Continued)

*Primary Examiner* — Anibal Rivera
(74) *Attorney, Agent, or Firm* — Kilpatrick Townsend & Stockton LLP

(57) ABSTRACT

Techniques are disclosed for creating a workspace. A data processing system receives a request to create a workspace to implement a portion of a model deployed in a production environment. One or more data objects and associated metadata thereof relevant to the portion of the model, and an execution venue for the workspace are obtained. A set of instructions is generated for executing the one or more data objects and the associated metadata in the workspace. The workspace is created within the execution venue by instantiating the portion of the model, the one or more data objects, and the associated metadata in the workspace. The portion of the model in the workspace is processed using the one or more data objects and the associated metadata in accordance with the set of instructions, and the production environment is updated by the data processing system based on the processing.

17 Claims, 8 Drawing Sheets

(51) Int. Cl.
  *G06F 8/35*      (2018.01)
  *G06F 16/245*    (2019.01)
  *G06F 21/62*     (2013.01)
  *G06F 16/23*     (2019.01)
  *G06F 16/2457*   (2019.01)

(52) U.S. Cl.
  CPC ...... *G06F 21/6218* (2013.01); *G06F 16/2379* (2019.01); *G06F 16/24573* (2019.01)

(56) References Cited

U.S. PATENT DOCUMENTS

| | | | | |
|---|---|---|---|---|
| 2005/0234697 A1* | 10/2005 | Pinto | ............... | G06Q 30/0254 703/22 |
| 2005/0234698 A1* | 10/2005 | Pinto | ............... | G06Q 30/02 703/22 |
| 2020/0175336 A1* | 6/2020 | Eberlein | ............... | G06N 20/00 |
| 2021/0019612 A1* | 1/2021 | Carrasco | ............... | G06N 5/003 |

OTHER PUBLICATIONS

A. Badii et al., Object Life Cycles & Interaction Environments for Cross Media Production & Distribution, 2005 IEEE, [Retrieved on 2023-22]. Retrieved from the internet: <URL: https://ieeexplore.ieee.org/stamp/stamp.jsp?tp=&arnumber=1592102> 8 Pages (1-8) (Year: 2005).*

Park, et al. *PerCon: A Personal Digital Library for Heterogeneous Data*, IFFF/ACM Joint Conference on Digital Libraries, 10 pages, Sep. 8, 2014.

Smith, et al., *FeatureHub: Towards Collaborative Data Science*, International Conference on Data Science and Advanced Analytics (DSAA), pp. 590-600, Oct. 19, 2017.

International Application No. PCT/IN2021/050739 received an International Search Report and Written Opinion dated Oct. 29, 2021, 12 pages.

* cited by examiner

MATERIALIZATION OF AN ANALYTICAL WORKSPACE

CROSS-REFERENCES TO RELATED APPLICATIONS

The present application claims the benefit and priority of India Provisional Application No. 202041033832 filed on Aug. 7, 2020, the entire contents of which are incorporated herein by reference for all purposes.

FIELD

The present disclosure relates generally to a data processing system, and more particularly, to techniques of creating, in a seamless manner, workspaces to implement at least a portion of a model deployed in a production environment.

BACKGROUND

With the popularization of the Internet, companies in various industries produce and process massive amounts of data at all times. In order to utilize the data, different companies extract a large number of different data indexes from the data according to the business preference of the companies, and the data indexes are used for measuring the business development conditions of the companies. For example, in an e-commerce website application, the data indexes for measuring company services may comprise factors such as a number of active user visits on a webpage per day, a click rate of users, a conversion rate per webpage, etc.

Typically, the processes undertaken by an organization are modeled as a workflow i.e., a pipeline, where different personnel e.g., data scientists, modelers, analysts, etc., can monitor the performance of the workflow. In such workflows, building complex sets of data transformations, both deterministic and statistical, to deliver use-cases that support deriving predicting results, typically requires the creation of private workspaces. Such private workspaces are usually addressed via desktop applications or a host of manual processes to correlate results back to source data and tie logic/compute transformations developed to production use cases. Such an approach of creating workspaces is inefficient as it tends to detach into silos and lose lineage of the overall workflow.

Embodiments described herein address these and other problems, individually and collectively.

SUMMARY

Techniques are provided (e.g., a method, a system, non-transitory computer-readable medium storing code or instructions executable by one or more processors) for creating workspaces to implement at least a portion of a model deployed in a production environment. Various embodiments are described herein, including methods, systems, non-transitory computer-readable storage media storing programs, code, or instructions executable by one or more processors, and the like.

In various embodiments, a method is provided that comprises: receiving, by a data processing system, a request to create a workspace to implement at least a portion of a model deployed in a production environment; obtaining, by the data processing system, one or more data objects and associated metadata thereof relevant to the portion of the model; obtaining, by the data processing system, an execution venue for the workspace; generating, by the data processing system, a set of instructions for executing the one or more data objects and the associated metadata in the workspace; creating, by the data processing system, the workspace within the execution venue, wherein the creating comprises instantiating the portion of the model, the one or more data objects, and the associated metadata in the workspace; processing the portion of the model in the workspace using the one or more data objects and the associated metadata in accordance with the set of instructions; and updating, by the data processing system, the production environment based on the processing.

In some embodiments, the method further comprises: obtaining from one or more databases associated with the production environment, a plurality of data objects and a plurality of metadata, the one or more databases maintaining a mapping of models deployed in the production environment and associated data objects; filtering the plurality of data objects and the plurality of metadata to obtain the one or more data objects and the associated metadata relevant to the portion of the model; and performing iteratively, a set of lookup operations with respect to the one or more databases associated with the production environment to obtain at least one data object related to the one or more data objects.

In some embodiments, the execution venue is an area within an application instance within the production environment or a remote application instance.

In some embodiments, the method further comprises: receiving from a user, the request to execute the portion of the model in the workspace; verifying whether the user is permitted to access the one or more data objects and the associated metadata thereof relevant to the portion of the model; and generating, in response to a successful verification, a provisioning executable that creates the workspace within the execution venue.

In some embodiments, the workspace is further configured for: ingesting data from data sources that are external to the data processing system; and creating at least one sandbox application or an analytical pipeline based on the portion of the model, and wherein the portion of the model in the workspace is processed using the at least one sandbox application or the analytical pipeline.

In some embodiments, the set of instructions is generated in a format that is transformable into an equivalent instruction set that can be executed in the execution venue hosting the workspace.

In some embodiments, updating the production environment further comprises: obtaining an initial state of the production environment prior to creating the workspace within the execution venue, the initial state including a first output of the model deployed in the production environment; replacing the portion of the model deployed in the production environment with the portion of the model processed in the workspace; and generating, based on the replacing, an updated state of the production environment, the updated state including a second output of the model deployed in the production environment.

In some embodiments, the model deployed in the production environment includes a plurality of sub-models, and the portion of the model corresponds to a sub-model of the plurality of the sub-models.

In some embodiments, the processing of the portion of the model in the workspace further comprises: re-training the portion of the model with respect to a training data set; and modifying one or more parameters of the portion of the model based on the re-training.

In some embodiments, creating the workspace within the execution venue further comprises: generating, by the data processing system, a provisioning executable capable of creating the workspace within the execution venue; and executing the provisioning executable to create the workspace within the execution venue.

In some embodiments, the method further comprises: storing in a database of the data processing system, configuration information of the workspace, the configuration information including at least the one or more data objects and the associated metadata thereof relevant to the portion of the model and information related to the execution venue; deleting, by the data processing system, the workspace created in the execution venue; and generating, by the data processing system, a new workspace in another execution venue based on the configuration information.

In some embodiments, the plurality of sub-models includes a neural network model, a linear regression model, a support vector machine model, or a clustering model.

In some embodiments, a computing device is provided that includes a processor, and a memory including instructions that, when executed with the processor, cause the computing device to, at least: receive a request to create a workspace to implement at least a portion of a model deployed in a production environment; obtain one or more data objects and associated metadata thereof relevant to the portion of the model; obtain an execution venue for the workspace; generate a set of instructions for executing the one or more data objects and the associated metadata in the workspace; create the workspace within the execution venue by instantiating the portion of the model, the one or more data objects, and the associated metadata in the workspace; process the portion of the model in the workspace using the one or more data objects and the associated metadata in accordance with the set of instructions; and update the production environment based on the processing.

In some embodiments, there is provided a non-transitory computer readable medium storing specific computer-executable instructions that, when executed by a processor, cause a computer system to at least: receive a request to create a workspace to implement at least a portion of a model deployed in a production environment; obtain one or more data objects and associated metadata thereof relevant to the portion of the model; obtain an execution venue for the workspace; generate a set of instructions for executing the one or more data objects and the associated metadata in the workspace; create the workspace within the execution venue by instantiating the portion of the model, the one or more data objects, and the associated metadata in the workspace; process the portion of the model in the workspace using the one or more data objects and the associated metadata in accordance with the set of instructions; and update the production environment based on the processing.

The techniques described above and below may be implemented in a number of ways and in a number of contexts. Several example implementations and contexts are provided with reference to the following figures, as described below in more detail. However, the following implementations and contexts are but a few of many.

DETAILED DESCRIPTION

Figure 1:
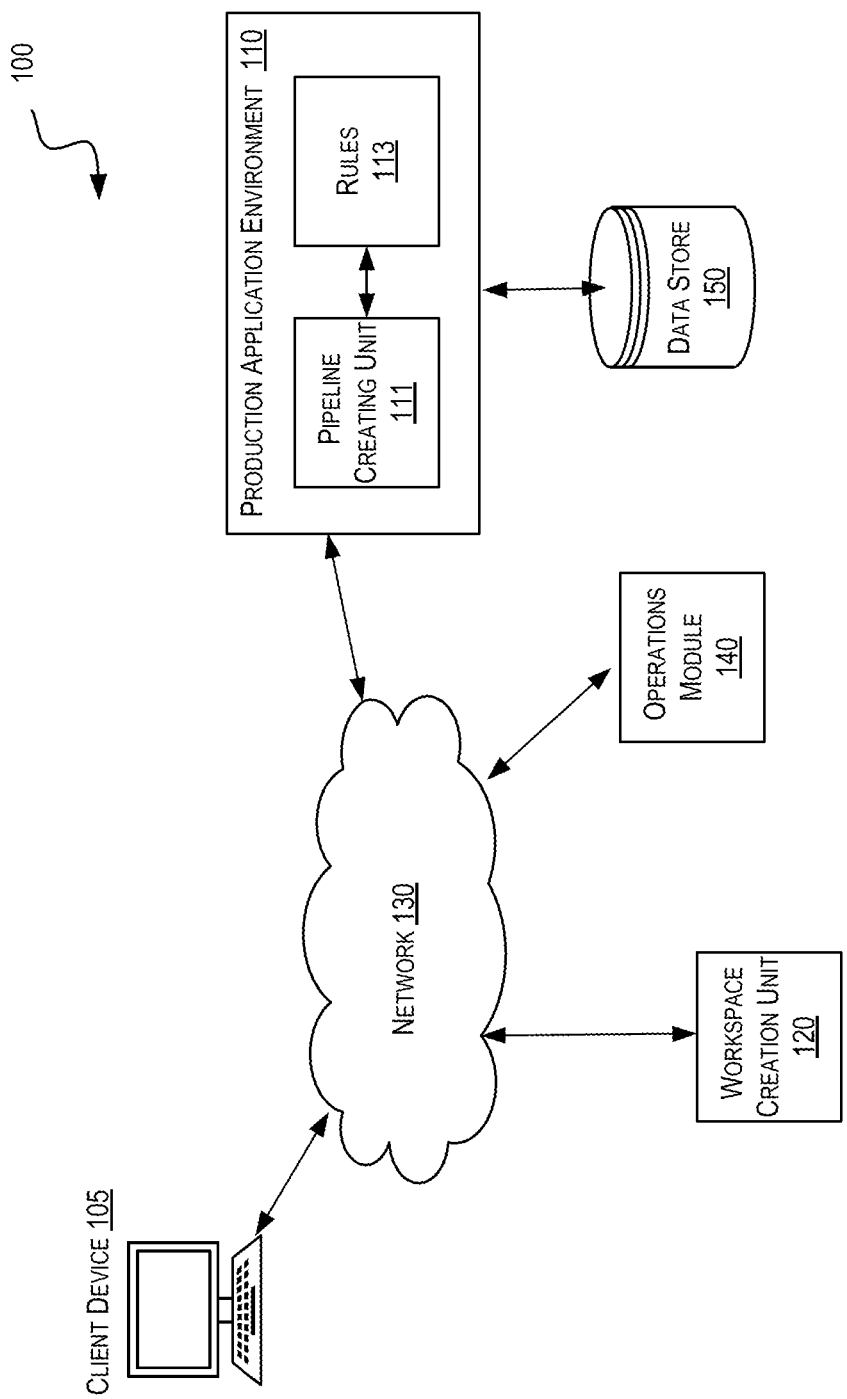
FIG. 1 is an illustration of a data processing system in accordance with various embodiments.

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Overview of a Data Processing System

Enterprises typically require constant monitoring of workflows to measure risk in order to conform to prevalent regulatory and supervisory standards. In such workflows, measurement often entails significant computations and validations with an enterprise's data. Data is transformed to support such measurements and calculations. The processing involved in the transformation of data includes large volumes of time-period data, and whose processing methodology is described as a series of tasks that perform data transformations and actions (including inserts/updates of computed values), which may be achieved through a set of defined rules.

A complex analytical workflow is modeled as an overall model (e.g., a machine-learning model) that constitutes several sub-models. Specifically, the several sub-models are stitched together (i.e., combined) in a predetermined manner to generate the overall model. The sub-models are executed in a predetermined order to determine one or more output variables of the overall model. Each sub-model includes a series of tasks that operate on one or more datasets and perform data transformations to compute the one or more output variables of the overall model. Thus, an execution of the overall model includes: (i) determining a plurality of input variables (i.e., input parameters to the one or more sub-models), (ii) executing the one or more sub-models in accordance with the predetermined order, and (iii) generating one or more output variables of the overall model. Such an overall model is deployed in a production environment of the enterprise. Different personnel, from different departments of the enterprise (e.g., developers, data scientists, etc.) can monitor the overall model in the production environment. The sub-models can include machine-learning models such as a neural network model, a linear regression model, a support vector machine model, or a clustering model.

A requirement in such complex analytical workflows is that the different entities may desire to extract a portion of the overall model (e.g. a sub-model) for further processing and development. For example, a department of the enterprise that built a particular sub-model of the overall model may desire to extract the sub-model (and associated data objects and metadata that are used to build the model) for the purpose of further processing and enhancing the sub-model e.g., to re-train the sub-model with respect to new training data, fine tune one or more parameters of the sub-model for enhanced performance, etc. Alternatively, it may also be desired to obtain a slice of the production environment data e.g., data objects, data records, etc., for the purposes of building a new predictive model, or evaluating scenarios for anomaly detection, studying data patterns etc. Described herein are mechanisms that enable the creation of a workspace (e.g., an area within an existing application instance, a remote application instance, or in a hybrid environment), where the desired sub-model, data objects, metadata etc., can be extracted to for further processing without affecting the functioning of the overall model in the production environment.

The various embodiments described herein may be used in an assortment of different domains and contexts. Certain embodiments are particularly applicable to enterprise application software provided in distributed computing technology. However, the systems and methods described herein may be used to provide data transformation functionality for any system or application framework where the creation of a workspace is desired. Techniques (e.g., systems, methods, and machine-readable media) are disclosed to enable a data processing system to instantiate a workspace and extract (from the production environment) relevant portions of the overall model i.e., a sub-model, specific data objects (and associated metadata thereof) to the workspace for further processing.

FIG. 1 depicts a data processing system 100 comprising a client device 105, a production application environment 110, a workspace creation unit 120, a network 130, an operations module 140, and a data storage 150 (e.g., memory store) in accordance with various embodiments. The production application environment 110 includes a pipeline creating unit 111 and a rules unit 113.

A user operating the client device 105 may be presented one or more application interfaces (e.g., graphical user interfaces) that accept input to enable the user to interact with the production application environment 110 and/or the workspace creation unit 120. Examples of a client device 105 include, without restriction, a workstation, personal computer (PC), laptop computer, mobile device such as a smart phone, wearable computer, or other networked electronic device. The interface presented at the client device 105 may be accessible using an application executing on the client device 105. The client device 105, the production application environment 110, the workspace creation unit 120, and the operations module 140 may communicate via one or more communication networks 130. Examples of communication networks 130 may include a mobile network, a wireless network, a cellular network, a local area network (LAN), a wide area network (WAN), other wireless communication networks, or combinations thereof.

By some embodiments, the pipeline creating unit 111 included in the production application environment 110 provisions the user to define the overall model as a pipeline (also referred to herein as a workflow) i.e., a combination of one or more sub-models that are stitched/combined together to form the overall model. The pipeline creating unit 111 also provisions the user to define and execute a set of rules, reporting objects, and processes that are required to transform data in the data processing system 100. The pipeline creating unit 111 provides an interface that allows the user via, for example, the client device 105, to define and execute rules, processes, and to manage definitions of each sub-model that is used to form the overall model. For example, many enterprises require constant monitoring and measurement of risk in order to conform to prevalent regulatory and supervisory standards. These measurements often entail significant computations and validations with an enterprise's data. The data is frequently transformed to support such measurements and calculations. These data transformation may be achieved through a set of defined rules.

The pipeline creating unit 111 provisions the user to define the rules 113 for executing the overall model e.g., define an execution order of the one or more sub-models that form the overall model. For example, a rule may include a first subset of the one or more sub-models being executed concurrently, while a second subset of the one or more sub-models is executed sequentially in order to determine one or more output variables of the overall model. Additionally, the pipeline creating unit 111 also provisions the user to define, via an application interface, one or more datasets that are to be obtained e.g., from external data sources with respect to which the overall model is to be evaluated. Such datasets can be obtained via the operations module 140 from the external data sources.

The rules unit 113 facilitates a user to define a set of rules, report objects, and processes that are implemented (e.g., with respect to a sub-model) to transform data in a storage device such as data storage 150. For example, the rules unit 113 provides a framework that facilitates the definition and maintenance of a transformation. A metadata abstraction layer may be used in the definition of rules where the user is permitted to re-classify the attributes in the data store 150 thus transforming the data. The underlying metadata objects such as hierarchies that are non-large or non-list, datasets and processors drive the rule functionality. Rules may include various types. For example, a Type 1 rule may involve creating a subset of records from a given set of records in the data model based on certain filters. This process can involve transformations, aggregation, or a combination thereof. Type 1 rule definitions may be achieved through a Table-to-Table (T2T) Extract. Type 2 rules may involve re-classification of records in a table in a data model based on criteria that include complex group-by clauses & sub-queries within the tables. Type 3 rules may involve computations of a new value or metric based on a simple measure and updating an identified set of records within the data model with the computed value. The pipeline creating unit 111 includes of a set of tools, which help a user to operate with the various rule definitions.

In various embodiments, the rules are defined to include one or more components. The components may include a dataset, a source, a target, a mapping, and/or node identifier. A dataset is a set of tables that are joined together by keys. A dataset may have at least one fact table. Fact tables store measurements, metrics or facts of a process. A fact table may be located at the center of a star schema or a snowflake schema surrounded by dimension tables. Dimensions tables store reference data (e.g., a list of products, list of branches, list of geographies, list of currencies, etc., that an entity deals with are relatively static). Where multiple fact tables are used, these can be arranged as a fact constellation schema. A fact table typically has two types of columns: those that contain facts and those that are a foreign key to dimension tables. The primary key of a fact table is usually a composite key that is made up of all of its foreign keys. Fact tables contain the content of the data store 150 and store different types of measures like additive, non-additive, and semi additive measures. Type 3 rule definitions may be based on datasets that contain more than one fact table. Type 2 rule definitions may be based on datasets that contain a single fact table. The values in one or more columns of the fact tables within a dataset may be transformed with a new value.

According to some embodiments, a set of rules collectively form a process. A process definition may be represented as a process tree. The rules unit 113 provides a framework that facilitates the definition and maintenance of a process. By defining a process, a user can logically group a collection of rules that pertain to a functional process. For example, a user can define a process with the existing metadata objects using a hierarchical structure, which facilitates the construction of a process tree. A process tree can have many levels and one or many nodes within each level. In this manner, the production application environment 110 can utilize the rules unit 113 to define a process for a sub-model of the complex analytical workflow. It is appreciated that a sub-model can include one or more tasks, each of which is to be executed in order to complete the execution of the sub-model. Sub-processes (e.g., of tasks of the sub-model) may be defined at level members and process hierarchy members form the leaf members of the tree. Thus, processes may include two types: (i) an end to end process, which denotes functional completeness and is ready for execution, and (ii) non-end to end process, which is a logical collection of rules and cannot be executed by itself. The non-end to end process may be defined as a sub-process in an end-to-end process to be executed. The rules unit 113 may be used to build a process tree by adding one or more members called process nodes. If there are predecessor tasks associated with any member, the tasks defined as predecessors precede the execution of that member.

The definitions created by the rules unit 113 result in a unique batch group. These batches could then be scheduled for execution via an interface provided by the production application environment 110. Every request for execution of a process (e.g., execution of a sub-model) may become a batch in a batch group. The production application environment 110 enables a user to have a workflow for executing the process. By some embodiments, the batches can then be executed from the operations module 140. For example, a user may select via the application programming interface (API), a process definition, which is to be marked for execution, where the name of the selected process definition appears in a run description textbox of the API. The API displays other information e.g., options such as the request execution ID, request execution description, request status, execution status, and edit.

The API may have options to select batches that are defined for execution. The request status "open" indicates that the selected process ID is ready for execution. The execution status "not started" indicates that the particular process definition/batch has not yet been executed. A user can selected the edit option to edit a request for execution. A user can also make use of a search and filter option to search for specific processes based on process name, process execution description, process execution ID, process type, request status, etc. A pagination option can also be provided to aid the user to manage a collaborated view of existing processes within the data processing system.

By some embodiments, the operation module 140 facilitates a user in administration and processing of data (e.g., enterprise data) to create the highest level of efficiency within the data processing system 100 and to derive results based on one or more specified rules. The operation module 140 may include units such as batch maintenance, batch execution, batch scheduler, batch monitor, batch processing report, batch cancellation, view log, and report generation.

The batch maintenance framework within the operation module 140 facilitates a user to create and maintain the batch definitions. The user can process the batch scheduled for execution from batch maintenance and also from other modules such as an advanced analytics infrastructure module (not shown) and the rules unit 113. The batch execution unit of the operations module 140 is configured to initiate a batch for processing. By some embodiments, when a batch is submitted for execution, a series of commands are transmitted to the data store 150 with respect to the defined components and parameters. This in turn returns an array of update counts (e.g., value definitions) when the commands are executed successfully. The batch scheduler unit in the operations module 140 facilitates a user to schedule a batch for later processing. The user can define a new batch schedule or update a previously defined batch schedule for processing.

The batch monitor unit of the operations module 140 facilitates a user to view the status of executed batch definitions along with the tasks details. A user can track the issues if any, on regular intervals and ensure smooth batch execution. An event log provides the user with real time status of the executed batches. The batch processing report in the operations module 140 facilitates a user to view the execution status of each task component defined in a batch. Batch cancellation unit of the operations module 140 facilitates a user to cancel or abort a batch, or a specific task, which is either scheduled or is in the process of execution. The view log unit facilitates a user to view the execution status of each task component defined in a batch. The report generation unit of the operations module 140 is configured to generate performance reports of the overall model that are to be provided to the client device 105.

The workspace creation unit 120 allows for instance, modelers, data and domain analysts to create one or more workspaces. In such workspaces, slices of data objects, logic abstractions, metadata, and/or portions of the overall model (i.e., a sub-model) from the production environment can be exported, such that the exported information can be processed in an independent manner (i.e., separate from the production environment) for different purposes. For instance, exported data objects, metadata and logic abstractions can be used for building predictive models or scenarios for anomaly detection or studying data patterns. An exported sub-model can be further trained and enhanced (e.g., optimize parameters of the sub-model) for enhanced performance. The workspace creation unit 120 allows for both data and associated objects (logic/compute) to be pulled into the workspace i.e., an area within existing application instance or into remote instance or in hybrid environments, while applying common/conformed metadata through interactive and offline generated instruction sets. Such an approach allows for replication, virtualization and deployments of trained logic/compute/models with automatic binding to targets governed by security entitlements, self-augmentation and controls.

According to some embodiments, the workspace creation unit 120 provides the client device 105 with a user interface wizard (e.g., a part of the operations module 115) that enables the client device 105 to create a workspace. The creation of a workspace may include: (i) data entity selection with controlled user's entitlements, (ii) automatically listing associated metadata (logic/compute) associated with selected logical data elements (i.e., datasets or data objects), (iii) allow selection of relevant metadata as required, (iv) scan for local, remote environments that can host the workspace (i.e., an execution venue for the workspace); and (v) list choices for workspace deployment (e.g., provision for data materialization to be hybrid). As will be described herein with reference to FIG. 3, an instruction set is generated for each of the above listed steps to create the workspace and export relevant data to the workspace. It is appreciated that the instruction set may be generated in a domain specific language, or scripting languages like Shell, Perl, Python including associations to logical model, metadata objects, data files. Further, the instruction set is generated in a manner that provisions the instruction set to be executed in desired execution venue of the workspace. Details regarding the creation of workspaces is described below with reference to FIGS. 2-5.

Figure 2:
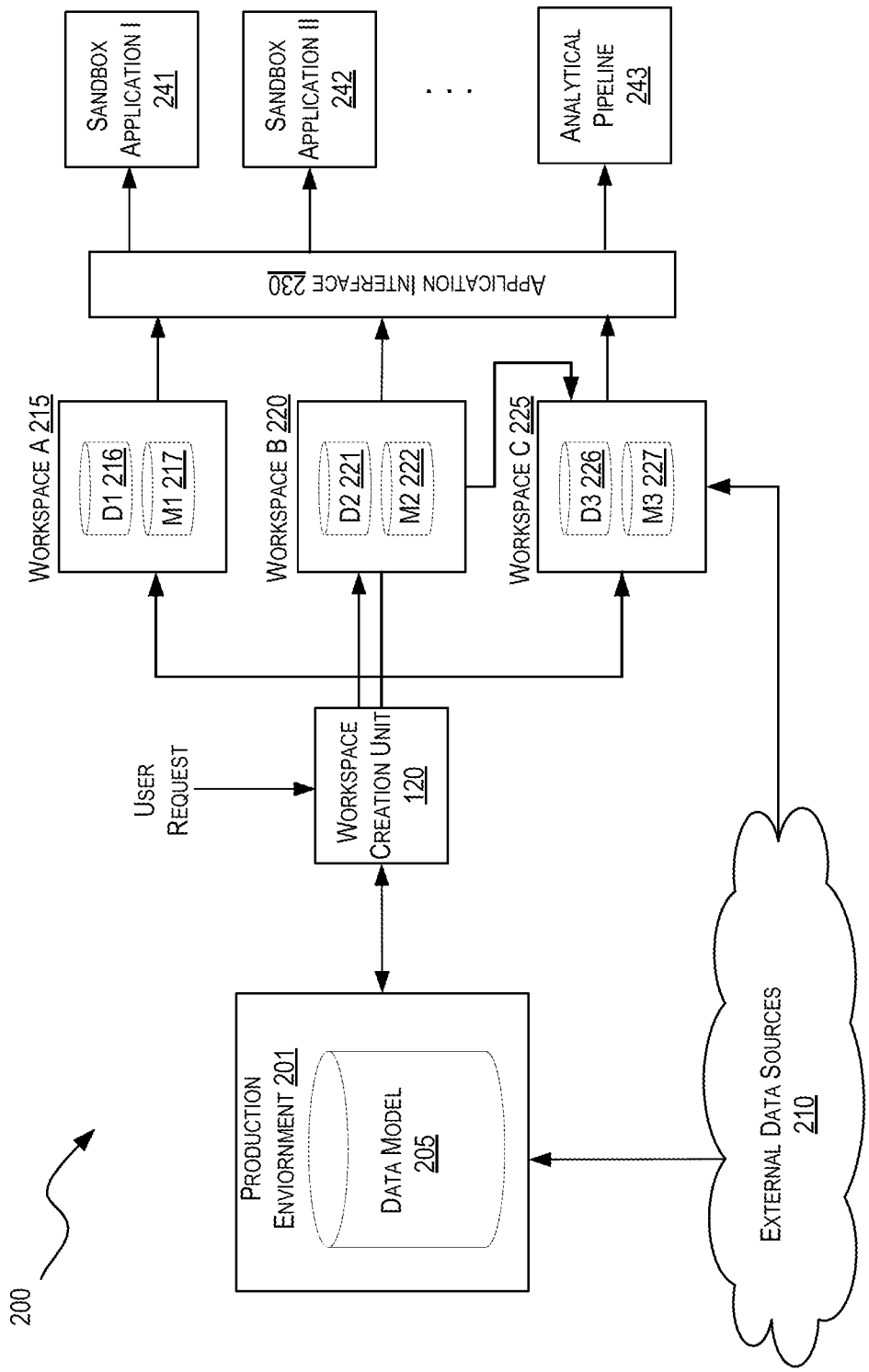
FIG. 2 is an illustration of provisioning a workspace in accordance with various embodiments.

FIG. 2 is an illustration of provisioning a workspace in accordance with various embodiments. As shown in the illustration 200 of FIG. 2, a data model 205 (e.g., an overall model) is deployed in a production environment 201. The data model 205 may be constructed based on data obtained from external data sources 210. The workspace creation unit 120 receives a request from a client device (e.g., client device 105 of FIG. 1) to create a workspace to implement at least a portion of the data model 205 deployed in the production environment 201.

According to some embodiments, the portion of the data model 205 desired to be implemented in the workspace may correspond to a particular sub-model of the data model (and associated data objects and metadata that are used to build the sub-model) for the purposes of further processing and enhancing the sub-model e.g., to re-train the sub-model with respect to new training data, fine tune one or more parameters of the sub-model for enhanced performance, etc. Additionally, the portion of the data model 205 desired to be implemented in the workspace may correspond to a slice of the production environment data e.g., data objects, data records, etc., for the purposes of building a new predictive model, or evaluating scenarios for anomaly detection, studying data patterns, etc. The portion of the data model 205 that is desired to be implemented in a workspace can be included in the request issued by the client device to the workspace creation unit 120.

It is appreciated that data objects, metadata, or data templates (e.g., a report template, an analytical template, a product hierarchy template, an organization hierarchy template, etc.,) can be extracted from the production environment 201 to be included in the workspace for further processing. In other words, the workspace creation unit 120 creates a copy of the data objects, metadata, etc., that are included in the production environment 201 and instantiates (i.e., physically deploys) the copies in the workspace. The instantiated data objects, metadata, etc., can be altered based on processing performed in the workspace e.g., testing a sub-model, updating the sub-model, etc. By some embodiments, upon completion of processing performed in a workspace, the data objects, metadata, portion of the model, etc., that are altered in a workspace, can be pushed back to the production environment via the workspace creation unit 120. For instance, in the scenario where a sub-model of the data model is instantiated in a workspace (e.g., for purposes of fine tuning or re-training the sub-model), the retrained/fine-tuned sub-model can be pushed back (upon completion) by the workspace creation unit 120 into the production environment 201.

In this manner, an older version of the sub-model deployed in the production environment 201 can be replaced with the retrained/fine-tuned sub-model from the workspace. Additionally, by some embodiments, the data processing system of FIG. 1 may provide an option of maintaining both, the older version of the sub-model as well as the updated version of the sub-model in the production environment 201. According to some embodiments, prior to the creation of the workspace, an initial state of the production environment 201 can be stored in a data storage (associated with the production environment 201), where the initial state includes a performance parameter (e.g., a first output) of the data model 205 deployed in the production environment 201. Upon replacing, for instance, an older version of a sub-model of the data model with the retrained/fine-tuned version of the sub-model (obtained from the workspace), the data processing system can generate an updated state of the production environment, where the updated state includes a new output (i.e., a second output different than the first output) of the model deployed in the production environment. The updated performance of the data model deployed in the production environment can be presented via an application interface to the client device.

The request issued by the client device to the workspace creation unit 120 includes information pertaining to an execution venue for the workspace to be created. Specifically, the execution venue corresponds to a destination environment where the workspace is desired to be created. According to some embodiments, the execution venue corresponds to an area within an application instance within the production environment (i.e., an in-memory workspace implementation) or a remote application instance, or a hybrid environment. A hybrid environment is defined herein as an environment that hosts a workspace, which is configured to extract data (in addition to data extracted from the production environment 201) from other workspaces, external data sources 210, etc.

Different client devices (e.g., from different departments of an organization) can issue workspace creation requests to the workspace creation unit 120. Note that each request includes information pertaining to the execution venue of the workspace as well as the portion of data model 205 that is to be instantiated in the workspace. The workspace creation unit 120 is configured to create a workspace for each request e.g., workspace A 215, workspace B 220, and workspace C 225. In each workspace, relevant data objects, metadata, and/or portion of the data model are copied and stored locally for further processing. For instance, as shown in FIG. 2, workspace A includes databases 216 and 217 that store a copy of the corresponding data objects and metadata requested by the client device, whereas workspace B includes databases 221 and 222 that store corresponding copies of requested data objects and metadata, and workspace C (deployed in a hybrid environment) includes databases 226 and 227 that store a copy of the corresponding data objects and metadata requested by the client device. As will be described in detail with reference to FIG. 3, filtering mechanisms can be utilized by the workspace creation unit 120 to obtain the relevant data that is to be instantiated in a workspace.

Further, as shown in FIG. 2, it is appreciated that workspace C is deployed in a hybrid environment, as it is configured to extract data from external data sources 210 as well as data from other workspaces (e.g., workspace B, 220). By some embodiments, each of the created workspaces 215, 220, and 225 can further create, via an application programming interface 230 (e.g. REST API), at least one sandbox application (241, 242) or an analytical pipeline (243) that aid in the processing/evaluation (e.g., of the sub-model) performed in the workspace. For instance, in the context of software development, a sandbox application is an isolated environment, in which code pertaining to the sub-model can be evaluated and tested. In a similar manner, a particular workspace (e.g., workspace A 215) can create an analytical pipeline 243, that can be used to emulate/test different portions (e.g. processes) included in a sub-model that is being processed in workspace A, 215.

Figure 3:
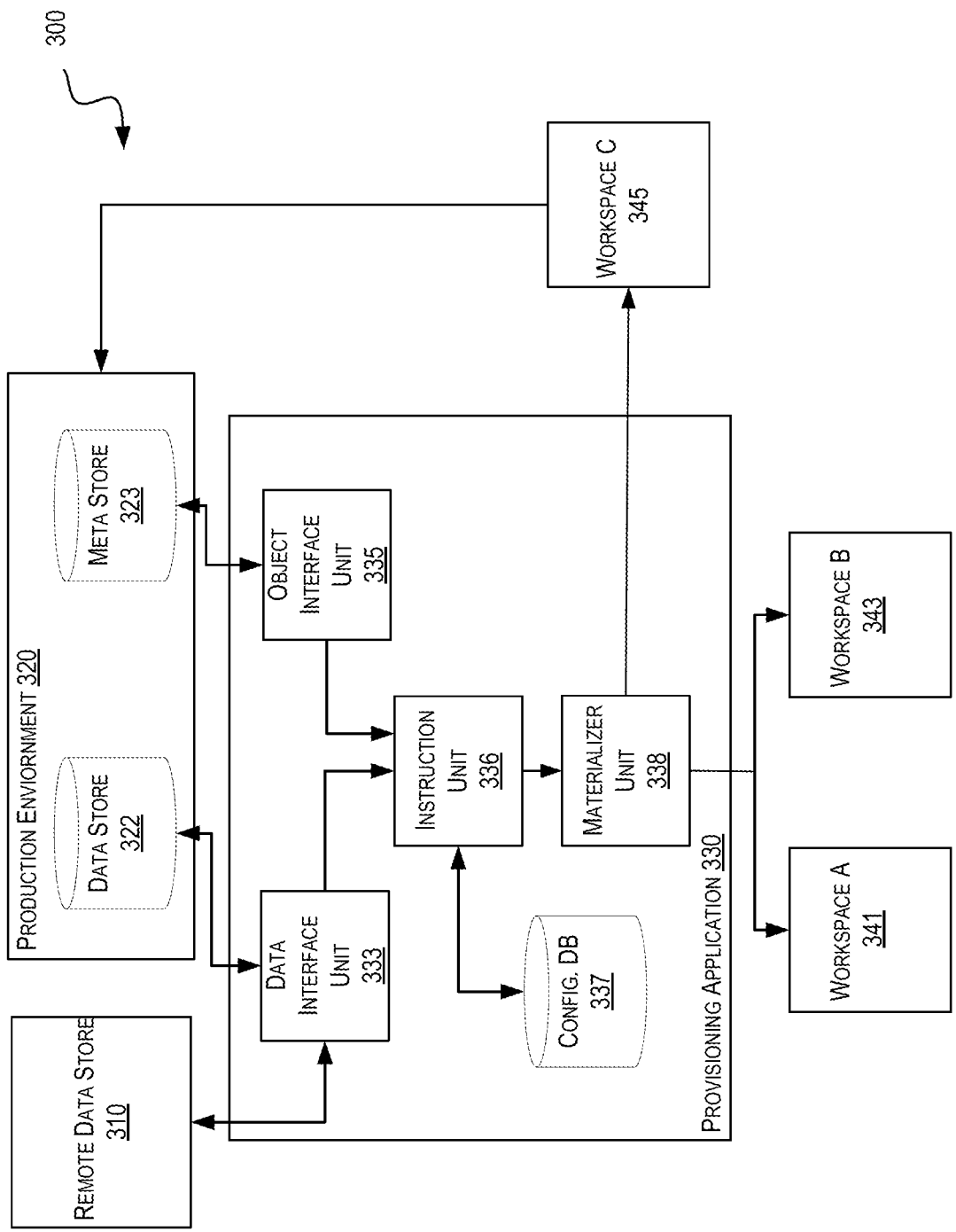
FIG. 3 illustrates details of provisioning a workspace in accordance with various embodiments.

FIG. 3 illustrates details of provisioning a workspace in accordance with various embodiments. Specifically, the schematic 300 depicted in FIG. 3 illustrates components of the workspace creation unit that is responsible for the creation of a workspace within an execution venue. As shown in FIG. 3, the workspace creation unit (e.g., the workspace creation unit 120 of FIG. 1) includes a provisioning application 330 that obtains data objects and associated metadata from a remote data store 310 and/or a production environment 320 and instantiates (i.e., physically materializes) the obtained information in one or more workspaces e.g., workspace A 341, workspace B 343, and workspace C 345.

By some embodiments, the provisioning application 330 includes a data interface unit 333, an object interface unit 335, an instruction unit 336, a configuration database 337, and a materializer unit 338. The data interface unit 333 is configured to extract data (e.g., data objects) from the remote data store 310, and a data store 322 included in the production environment 320. The object interface unit 335 is configured to extract metadata (e.g., metadata associated with data objects) from a meta store 323 included in the production environment 320. The extracted metadata along with the extracted data objects is instantiated by the provisioning application in a workspace e.g., workspace A 341, workspace B 343, and workspace C 345. As shown in FIG. 3, the provisioning application 330 of the workspace creation unit can materialize (i.e., physically deploy) different types of workspaces. For instance, workspace A 341, and workspace B 343 are deployed in execution venues that are remote application instances or in a hybrid environment, whereas workspace C in deployed in an area within an application instance within the production environment 320 i.e., an in-memory workspace implementation.

By some embodiments, the data interface unit 333 as well as the object interface unit 335 may utilize filtering mechanisms to obtain relevant data (and metadata) from the remote data store 310 and the production environment 320. Details regarding the operation of the data interface unit 333 are described herein with reference to FIG. 4. The data objects obtained via the data interface unit 333 and the metadata obtained via the object interface unit 335 are input to the instruction unit 337. The instruction unit 337 generates a set of instructions for executing the one or more data objects and the associated metadata in the workspace that is to be created within the execution venue. Specifically, the set of instructions is generated by the instruction unit 337 in a format that is transformable into an equivalent instruction set that can be executed in the execution venue hosting the workspace. Thus, the instruction unit 337 generates the instruction set as an executable script (e.g., an artifact) that can be executed in different workspace environments. In other words, the instruction set generated by the instruction unit 337 is target agnostic (i.e., workspace agnostic), where the data objects and metadata can be materialized in different workspace environments via execution of the executable script. For example, the workspace creation unit can extract data from different types of data stores e.g., a bit-data store, a relational data store, etc., and materialize the extracted data in any environment e.g. a big data environment.

By some embodiments, for a workspace creation request issued by a client device, information pertaining to the generated instruction set (and associated data objects and metadata), the execution venue of the workspace, etc., is stored by the instruction unit 337 as configuration information of the workspace in the configuration database 336. Storing such configuration information of different workspaces in the configuration database 336, enables the workspace creation unit 120 to seamlessly create workspaces in the future. For instance, consider that configuration information of a particular workspace (e.g., workspace A 341) is stored in the configuration database 336. Assume that at some point in time, workspace A is deleted via a request issued by the client device. Thereafter, if the client device wants to re-create workspace A, the workspace creation unit can simply retrieve the configuration information from the configuration database 336 to materialize workspace A. In doing so, the workspace creation unit avoids the need to extract (again) all the data objects and associated metadata from the remote data store 310 and/or the production environment 320, thus saving compute resources of the data processing system. Furthermore, the workspace creation unit can provide the client device (via an API), a list of data objects and metadata previously associated with the workspace. The client device can utilize the list of data objects and metadata, as well as instruct the workspace creation unit to retrieve additional data objects (or metadata) while re-creating a new instance of the workspace.

According to some embodiments, the materializer unit 339 is configured to process the extracted data objects and metadata and generate a provisioning executable (e.g., a script) that is capable (upon execution) to physically create the workspace in an execution venue. Upon the workspace being created, the workspace creation unit can instantiate the extracted data objects, metadata, and/or a portion of the data model (i.e., a sub-model) within the workspace for further processing.

Figure 4:
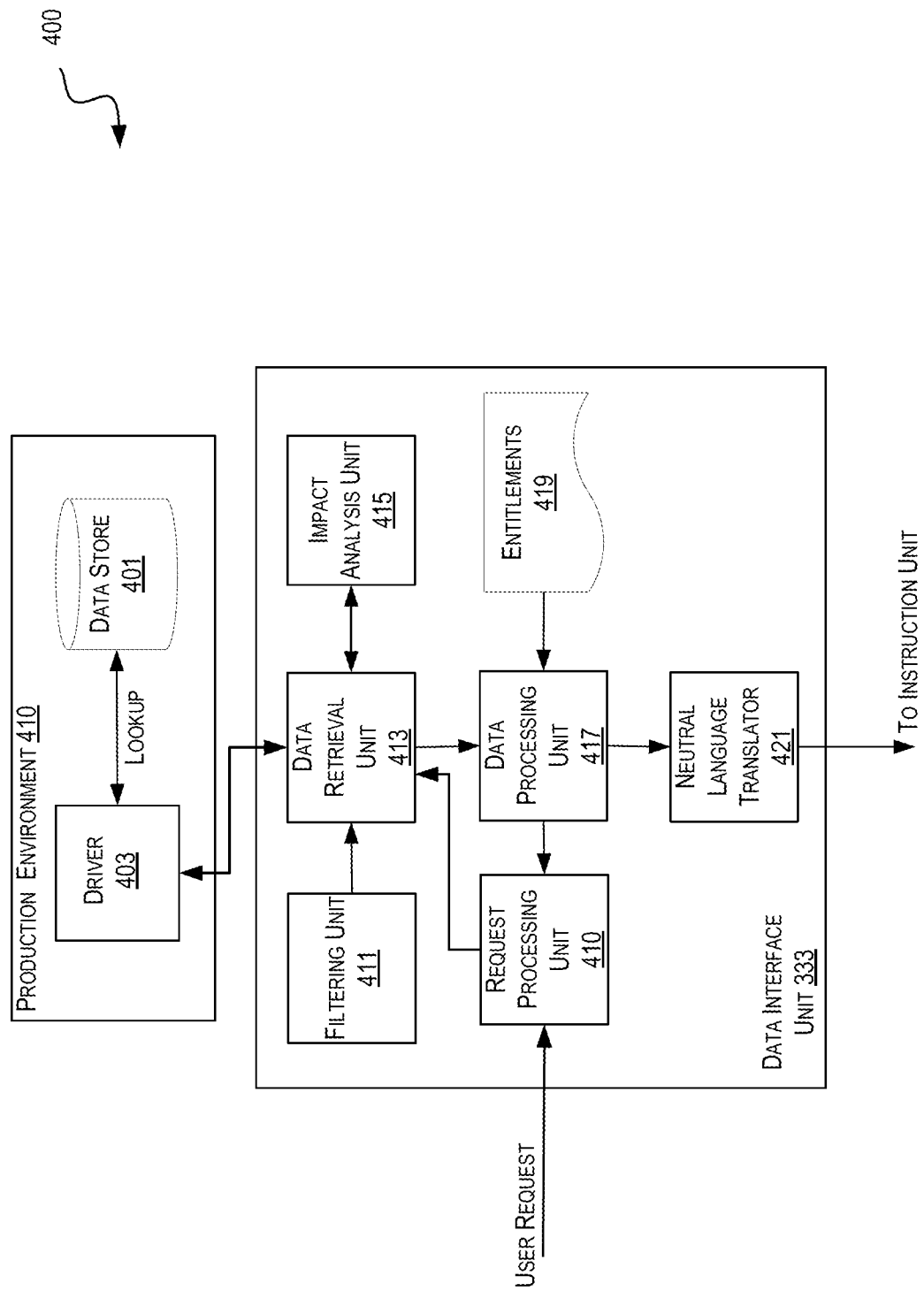
FIG. 4 illustrates a data interface unit in accordance with various embodiments.

FIG. 4 illustrates a data interface unit in accordance with various embodiments. Specifically, FIG. 4 depicts a schematic 400 illustrating components of a data interface unit 333 included within a provisioning application 330 of FIG. 3. The data interface unit 333 includes a request processing unit 410, a filtering unit 411, a data retrieval unit 413, an impact analysis unit 415, a data processing unit 417, entitlements 419, and a neutral language translator 421.

According to some embodiments, the request issued by a client device (e.g., user request issued via the client device 105 of FIG. 1) for creation of a workspace is directed to the workspace creation unit. Specifically, the request is directed to the request processing unit 410 of the data interface unit 333. The request processing unit 410 is configured to process a request, for example, extract information pertaining to an execution venue of the workspace, obtain information pertaining to the portion of the model (e.g., data model 205 deployed in the production environment 201) that is to be implemented in the workspace, etc. Upon processing the request for workspace creation, the request processing unit 410 triggers the data retrieval unit 413.

The data retrieval unit 413 communicates with a driver 403 included in the production environment 410. The driver 403 performs lookup operations with respect to a data store 401 (of the production environment 410) to retrieve data objects, functions, etc. The information extracted from the data store 401 is passed to the data retrieval unit 413 of the data interface unit 333. According to some embodiments, when the user request pertains to the creation of a sub-model within a workspace, the data retrieval unit 413 transmits an identifier associated with the sub-model to the driver 403. The driver 403 utilizes the identifier to perform look up operations on the data store 401, which maintains a mapping of models deployed in the production environment and associated data objects. In this manner, the driver can extract relevant data objects associated with the sub-model, and transmit the extracted data objects to the data retrieval unit 413.

By some embodiments, the data retrieval unit 413 communicated with the impact analysis unit 415 to perform analysis of the retrieved data objects. For instance, the impact analysis unit 415 checks for dependencies of the extracted data objects i.e., determines one or more additional data objects that are dependent on the retrieved data objects, and notifies the data retrieval unit 413 to retrieve the additional data objects. By some embodiments, the data interface unit 333 utilizes the filtering unit 411 to perform filtering operation(s) on the retrieved data objects to obtain a set of relevant data objects with respect to the request. For instance, the request to create the workspace may include information pertaining to a user's preference with respect to the data objects. Such user preferences can be utilized as a filtering mechanism to obtain the most relevant set of data objects that are to be materialized in the workspace.

Further, the retrieved and/or filtered data objects are passed to the data processing unit 417, which utilizes entitlements 419 (i.e., a set of one or more access rights) to determine, whether a user (e.g., user that initiated the workspace creation request) is authorized to the access each of the retrieved and/or filtered data objects. In response to the data processing unit 417 determining that the user is not authorized to access one or more of the retrieved data objects, the data processing unit 417 may trigger the request processing unit 410 to transmit an electronic message to the client device notifying the user of such determination. Additionally, the electronic message may include a notification stating to the user that the workspace creation request cannot be completed sue to access issues. However, in response to successfully determining that the user is authorized to access each of the one or more data objects, the data processing unit 417 activates the neutral language translator 421.

By some embodiments, the neutral language translator 421 is configured to convert a format of the data objects, metadata, etc., into a format that is acceptable by the environment of the execution venue of the workspace. In doing so, the data interface unit 333 ensures that the extracted one or more data objects can be utilized for further processing the workspace. By some embodiments, the data processing unit 417, upon successfully determining that the user is authorized to access each of the one or more data objects triggers the materializer (unit 338 of FIG. 3) to generate a provisioning executable that creates the workspace within the execution venue. Additionally, the data processing unit 417 can also trigger the request processing unit 410 to transmit an electronic message to the client device indicating a successful authorization of the user with respect to the one or more data objects. The one or more data objects processed by the neutral language translator 421 are passed to the instruction unit (i.e., unit 336 of FIG. 3) to commence with the process of creating the workspace in the execution venue.

Figure 5:
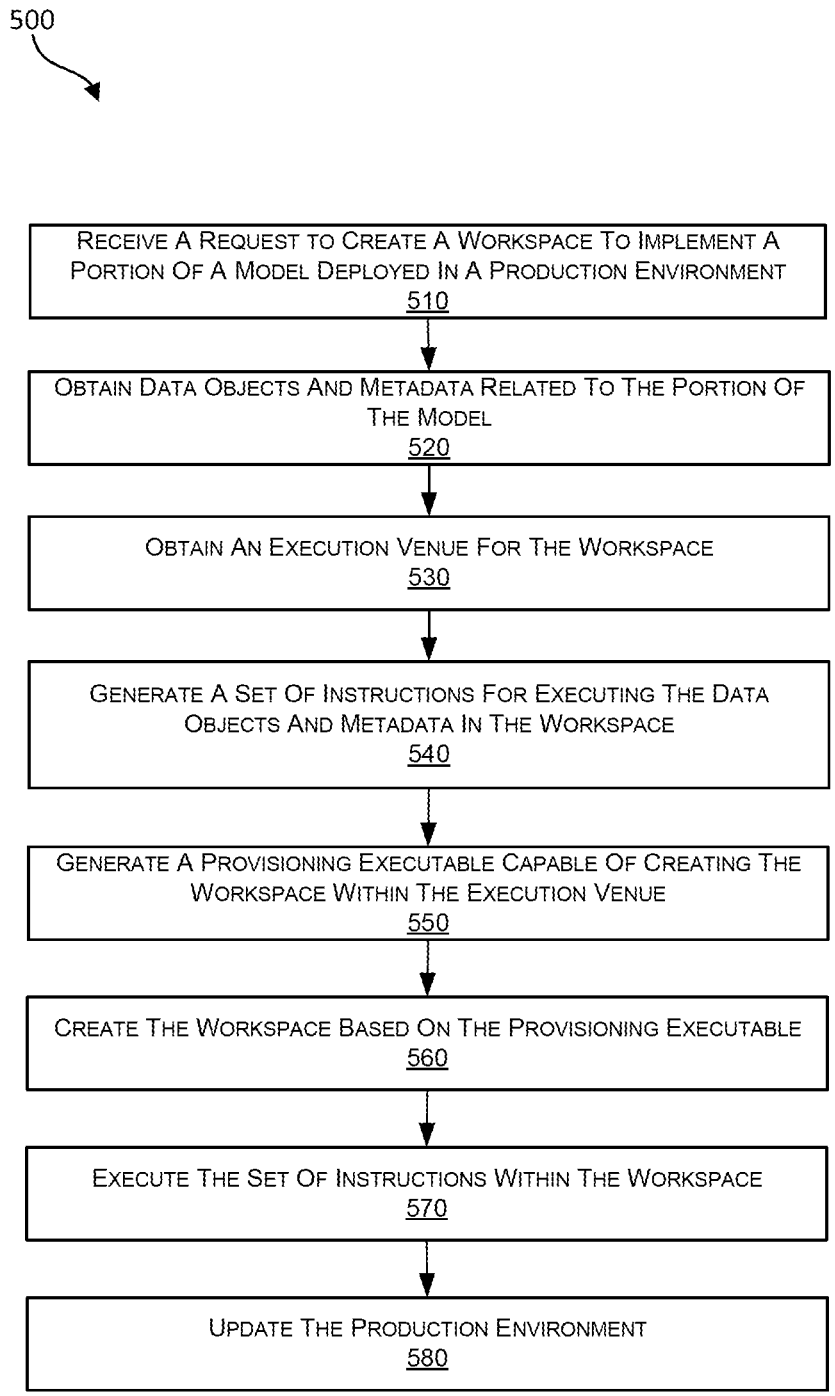
FIG. 5 depicts a flowchart illustrating a process of workspace provisioning in accordance with various embodiments.

FIG. 5 illustrates a flowchart 500 depicting a process of workspace provisioning performed by the workspace creation unit of a data processing system in accordance with various embodiments. The processing depicted in FIG. 5 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 5 and described below is intended to be illustrative and non-limiting. Although FIG. 5 depicts the various processing steps occurring in a particular sequence or order, this is not intended to be limiting. In certain alternative embodiments, the steps may be performed in some different order or some steps may also be performed in parallel.

The process commences in step 510, where the workspace creation unit receives a request (e.g., from a client device) to create a workspace to implement at least a portion of a model deployed in a production environment. The portion of the model (e.g., data model 205 of FIG. 5) desired to be implemented in the workspace may correspond to a particular sub-model of the data model (and associated data objects and metadata that are used to build the sub-model) for the purposes of further processing and enhancing the sub-model e.g., to re-train the sub-model with respect to new training data, fine tune one or more parameters of the sub-model for enhanced performance, etc. By some embodiments, the portion of the model desired to be implemented in the workspace may correspond to a slice of the production environment data e.g., data objects, data records, etc., for the purposes of building a new predictive model, or evaluating scenarios for anomaly detection, studying data patterns.

The process then proceeds to step 520, where the workspace creation unit obtains, from the production environment (e.g., data store and meta store included in the production environment), data objects and associated metadata related to the portion of the model. The workspace creation unit obtains the relevant data objects and associated metadata by performing look up operations on the data store and meta store, which maintain a mapping of models deployed in the production environment and the associated data objects and metadata utilized by the models. In step 530, the workspace creation unit obtains an execution venue i.e., a destination where the workspace is to be created. The workspace creation unit extracts the execution venue information embedded in the workspace creation request issued by the client device.

The process thereafter proceeds to step 540, where the workspace creation unit generates a set of instructions for executing the one or more data objects and the associated metadata in the workspace. It is appreciated that the set of instructions is generated in a format that is transformable into an equivalent instruction set that can be executed in the execution venue hosting the workspace. In step 550, the workspace creation unit generates a provisioning executable (e.g., a script) that is capable, upon execution (step 560), to physically create the workspace in the execution venue. It is appreciated that by some embodiments, the workspace creation unit generates the provisioning executable in response to determining that a user (associated with the client device) that issued the request to create the workspace is authorized to access the relevant data objects and the associated metadata obtained in step 520.

In step 570, the workspace creation unit executed the set of instructions in the created workspace. Specifically, the workspace creation unit instantiates the extracted data objects, metadata, and/or a portion of the data model (i.e., a sub-model) within the workspace for further processing.

Upon completion of processing the sub-model in the workspace, the process in step 580 updates the production environment. For instance, an older version of the sub-model deployed in the production environment 201 can be replaced with the processed i.e., retrained/fine-tuned sub-model from the workspace.

Additionally, by some embodiments, the data processing system may provide an option of maintaining both, the older version of the sub-model as well as the updated version of the sub-model in the production environment. As stated previously, prior to the creation of the workspace, an initial state of the production environment can be stored in a data storage associated with the production, where the initial state includes a performance parameter (e.g., a first output) of the data model deployed in the production environment 201. Upon replacing, for instance, an older version of a sub-model of the data model with the retained/fine-tuned version of the sub-model (obtained from the workspace), the data processing system can generate an updated state of the production environment, where the updated state includes a new output (i.e., a second output different than the first output) of the model deployed in the production environment.

Illustrative Systems

Figure 6:
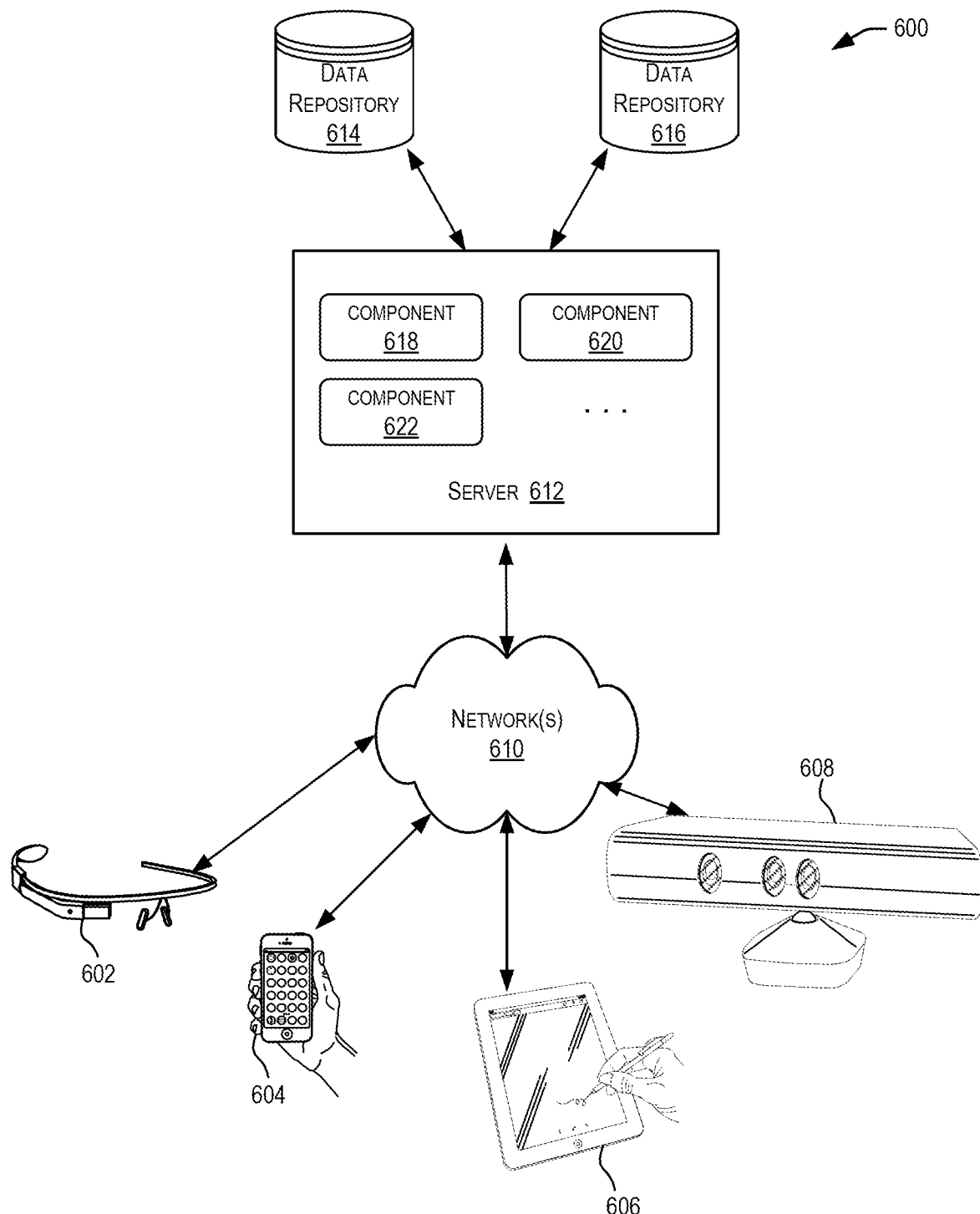
FIG. 6 depicts a simplified diagram of a distributed system for implementing various embodiments.

FIG. 6 depicts a simplified diagram of a distributed system 600. In the illustrated example, distributed system 600 includes one or more client computing devices 602, 604, 606, and 608, coupled to a server 612 via one or more communication networks 610. Clients computing devices 602, 604, 606, and 608 may be configured to execute one or more applications.

In various examples, server 612 may be adapted to run one or more services or software applications that enable one or more embodiments described in this disclosure. In certain examples, server 612 may also provide other services or software applications that may include non-virtual and virtual environments. In some examples, these services may be offered as web-based or cloud services, such as under a Software as a Service (SaaS) model to the users of client computing devices 602, 604, 606, and/or 608. Users operating client computing devices 602, 604, 606, and/or 608 may in turn utilize one or more client applications to interact with server 612 to utilize the services provided by these components.

In the configuration depicted in FIG. 6, server 612 may include one or more components 618, 620 and 622 that implement the functions performed by server 612. These components may include software components that may be executed by one or more processors, hardware components, or combinations thereof. It should be appreciated that various different system configurations are possible, which may be different from distributed system 600. The example shown in FIG. 6 is thus one example of a distributed system for implementing an example system and is not intended to be limiting.

Users may use client computing devices 602, 604, 606, and/or 608 to execute one or more applications, models or chatbots, which may generate one or more events or models that may then be implemented or serviced in accordance with the teachings of this disclosure. A client device may provide an interface that enables a user of the client device to interact with the client device. The client device may also output information to the user via this interface. Although FIG. 6 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., Email applications, short message service (SMS) applications) and may use various communication protocols.

Network(s) 610 may be any type of network familiar to those skilled in the art that may support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 610 may be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 612 may include one or more virtual machines running virtual operating systems, or other computing architectures involving virtualization such as one or more flexible pools of logical storage devices that may be virtualized to maintain virtual storage devices for the server. In various examples, server 612 may be adapted to run one or more services or software applications that provide the functionality described in the foregoing disclosure.

The computing systems in server 612 may run one or more operating systems including any of those discussed above, as well as any commercially available server operating system. Server 612 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 612 may include one or more applications to analyze and consolidate data feeds and/or event updates received from users of client computing devices 602, 604, 606, and 608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 612 may also include one or more applications to display the data feeds and/or real-time events via one or more display devices of client computing devices 602, 604, 606, and 608.

Distributed system 600 may also include one or more data repositories 614, 616. These data repositories may be used to store data and other information in certain examples. For example, one or more of the data repositories 614, 616 may be used to store information such as information related to chatbot performance or generated models for use by chatbots used by server 612 when performing various functions in accordance with various embodiments. Data repositories 614, 616 may reside in a variety of locations. For example, a data repository used by server 612 may be local to server 612 or may be remote from server 612 and in communication with server 612 via a network-based or dedicated connection. Data repositories 614, 616 may be of different types. In certain examples, a data repository used by server 612 may be a database, for example, a relational database, such as databases provided by Oracle Corporation® and other vendors. One or more of these databases may be adapted to enable storage, update, and retrieval of data to and from the database in response to SQL-formatted commands.

In certain examples, one or more of data repositories 614, 616 may also be used by applications to store application data. The data repositories used by applications may be of different types such as, for example, a key-value store repository, an object store repository, or a general storage repository supported by a file system.

Figure 7:
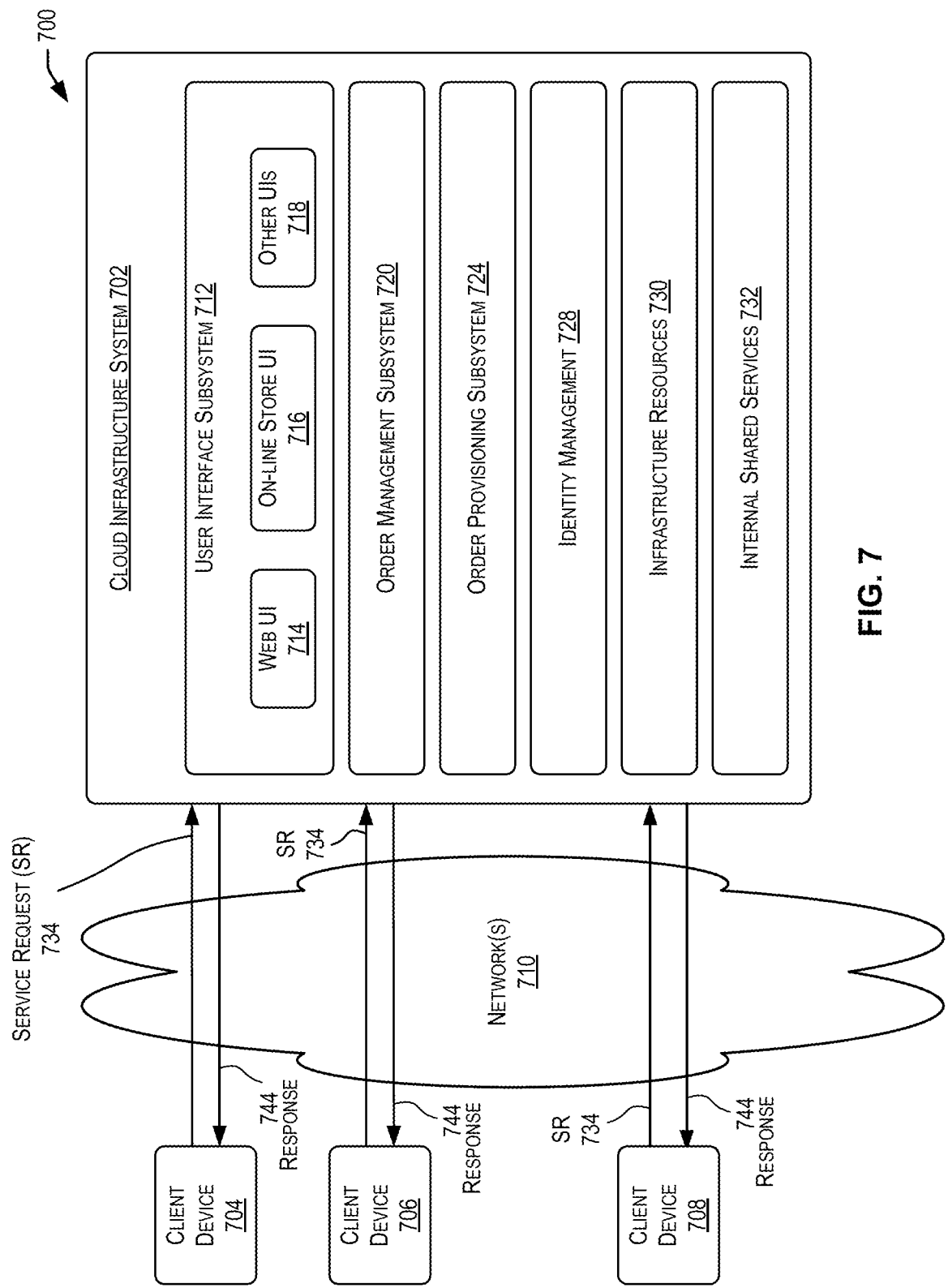
FIG. 7 is a simplified block diagram of one or more components of a system environment by which services provided by one or more components of an embodiment system may be offered as cloud services, in accordance with various embodiments.

In certain examples, the functionalities described in this disclosure may be offered as services via a cloud environment. FIG. 7 is a simplified block diagram of a cloud-based system environment in which various services may be offered as cloud services in accordance with certain examples. In the example depicted in FIG. 7, cloud infrastructure system 702 may provide one or more cloud services that may be requested by users using one or more client computing devices 704, 706, and 708. Cloud infrastructure system 702 may comprise one or more computers and/or servers that may include those described above for server 612. The computers in cloud infrastructure system 702 may be organized as general purpose computers, specialized server computers, server farms, server clusters, or any other appropriate arrangement and/or combination.

Network(s) 710 may facilitate communication and exchange of data between clients 704, 706, and 708 and cloud infrastructure system 702. Network(s) 710 may include one or more networks. The networks may be of the same or different types. Network(s) 710 may support one or more communication protocols, including wired and/or wireless protocols, for facilitating the communications.

The example depicted in FIG. 7 is only one example of a cloud infrastructure system and is not intended to be limiting. It should be appreciated that, in some other examples, cloud infrastructure system 702 may have more or fewer components than those depicted in FIG. 7, may combine two or more components, or may have a different configuration or arrangement of components. For example, although FIG. 7 depicts three client computing devices, any number of client computing devices may be supported in alternative examples.

The term cloud service is generally used to refer to a service that is made available to users on demand and via a communication network such as the Internet by systems (e.g., cloud infrastructure system 702) of a service provider. Typically, in a public cloud environment, servers and systems that make up the cloud service provider's system are different from the customer's own on-premise servers and systems. The cloud service provider's systems are managed by the cloud service provider. Customers may thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain examples, cloud infrastructure system 702 may provide one or more cloud services using different models such as under a Software as a Service (SaaS) model, a Platform as a Service (PaaS) model, an Infrastructure as a Service (IaaS) model, and others, including hybrid service models. Cloud infrastructure system 702 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 702. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 702. Cloud infrastructure system 702 then performs processing to provide the services requested in the customer's subscription order. For example, a user may use utterances to request the cloud infrastructure system to take a certain action (e.g., an intent), as described above, and/or provide services for a chatbot system as described herein. Cloud infrastructure system 702 may be configured to provide one or even multiple cloud services.

Cloud infrastructure system 702 may provide the cloud services via different deployment models. In a public cloud model, cloud infrastructure system 702 may be owned by a third party cloud services provider and the cloud services are offered to any general public customer, where the customer may be an individual or an enterprise. In certain other examples, under a private cloud model, cloud infrastructure system 702 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other examples, under a community cloud model, the cloud infrastructure system 702 and the services provided may be shared by several organizations in a related community. Various other models such as hybrids of the above mentioned models may also be used.

Client computing devices 704, 706, and 708 may be of different types (such as client computing devices 602, 604, 606, and 608 depicted in FIG. 6) and may be capable of operating one or more client applications. A user may use a client device to interact with cloud infrastructure system 702, such as to request a service provided by cloud infrastructure system 702. For example, a user may use a client device to request information or action from a chatbot as described in this disclosure.

In some examples, the processing performed by cloud infrastructure system 702 for providing services may involve model training and deployment. This analysis may involve using, analyzing, and manipulating data sets to train and deploy one or more models. This analysis may be performed by one or more processors, possibly processing the data in parallel, performing simulations using the data, and the like. For example, big data analysis may be performed by cloud infrastructure system 702 for generating and training one or more models for a chatbot system. The data used for this analysis may include structured data (e.g., data stored in a database or structured according to a structured model) and/or unstructured data (e.g., data blobs (binary large objects)).

As depicted in the example in FIG. 7, cloud infrastructure system 702 may include infrastructure resources 730 that are utilized for facilitating the provision of various cloud services offered by cloud infrastructure system 702. Infrastructure resources 730 may include, for example, processing resources, storage or memory resources, networking resources, and the like. In certain examples, the storage virtual machines that are available for servicing storage requested from applications may be part of cloud infrastructure system 702. In other examples, the storage virtual machines may be part of different systems.

In certain examples, to facilitate efficient provisioning of these resources for supporting the various cloud services provided by cloud infrastructure system 702 for different customers, the resources may be bundled into sets of resources or resource modules (also referred to as "pods").

Each resource module or pod may comprise a pre-integrated and optimized combination of resources of one or more types. In certain examples, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 702 may itself internally use services 732 that are shared by different components of cloud infrastructure system 702 and which facilitate the provisioning of services by cloud infrastructure system 702. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 702 may comprise multiple subsystems. These subsystems may be implemented in software, or hardware, or combinations thereof. As depicted in FIG. 7, the subsystems may include a user interface subsystem 712 that enables users or customers of cloud infrastructure system 702 to interact with cloud infrastructure system 702. User interface subsystem 712 may include various different interfaces such as a web interface 714, an online store interface 716 where cloud services provided by cloud infrastructure system 702 are advertised and are purchasable by a consumer, and other interfaces 718. For example, a customer may, using a client device, request (service request 734) one or more services provided by cloud infrastructure system 702 using one or more of interfaces 714, 716, and 718. For example, a customer may access the online store, browse cloud services offered by cloud infrastructure system 702, and place a subscription order for one or more services offered by cloud infrastructure system 702 that the customer wishes to subscribe to. The service request may include information identifying the customer and one or more services that the customer desires to subscribe to. For example, a customer may place a subscription order for a service offered by cloud infrastructure system 702. As part of the order, the customer may provide information identifying a chatbot system for which the service is to be provided and optionally one or more credentials for the chatbot system.

In certain examples, such as the example depicted in FIG. 7, cloud infrastructure system 702 may comprise an order management subsystem (OMS) 720 that is configured to process the new order. As part of this processing, OMS 720 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 720 may then invoke the order provisioning subsystem (OPS) 724 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 724 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

In certain examples, setup phase processing, as described above, may be performed by cloud infrastructure system 702 as part of the provisioning process. Cloud infrastructure system 702 may generate an application ID and select a storage virtual machine for an application from among storage virtual machines provided by cloud infrastructure system 702 itself or from storage virtual machines provided by other systems other than cloud infrastructure system 702.

Cloud infrastructure system 702 may send a response or notification 744 to the requesting customer to indicate when the requested service is now ready for use. In some instances, information (e.g., a link) may be sent to the customer that enables the customer to start using and availing the benefits of the requested services. In certain examples, for a customer requesting the service, the response may include a chatbot system ID generated by cloud infrastructure system 702 and information identifying a chatbot system selected by cloud infrastructure system 702 for the chatbot system corresponding to the chatbot system ID.

Cloud infrastructure system 702 may provide services to multiple customers. For each customer, cloud infrastructure system 702 is responsible for managing information related to one or more subscription orders received from the customer, maintaining customer data related to the orders, and providing the requested services to the customer. Cloud infrastructure system 702 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 702 may provide services to multiple customers in parallel. Cloud infrastructure system 702 may store information for these customers, including possibly proprietary information. In certain examples, cloud infrastructure system 702 comprises an identity management subsystem (IMS) 728 that is configured to manage customer information and provide the separation of the managed information such that information related to one customer is not accessible by another customer. IMS 728 may be configured to provide various security-related services such as identity services, such as information access management, authentication and authorization services, services for managing customer identities and roles and related capabilities, and the like.

Figure 8:
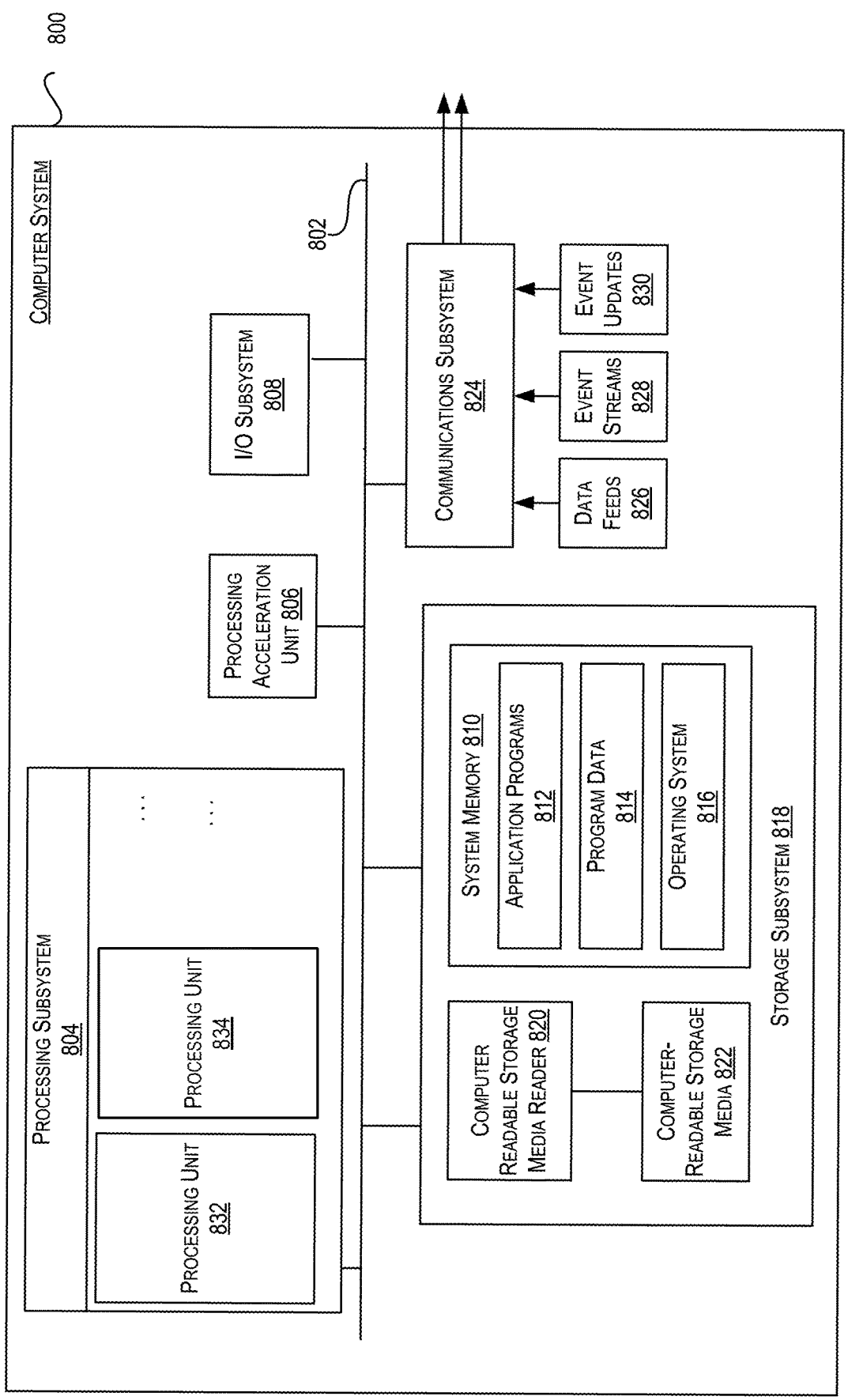
FIG. 8 illustrates an example computer system that may be used to implement various embodiments.

FIG. 8 illustrates an example of computer system 800. In some examples, computer system 800 may be used to implement any of the digital assistant or chatbot systems within a distributed environment, and various servers and computer systems described above. As shown in FIG. 8, computer system 800 includes various subsystems including a processing subsystem 804 that communicates with a number of other subsystems via a bus subsystem 802. These other subsystems may include a processing acceleration unit 806, an I/O subsystem 808, a storage subsystem 818, and a communications subsystem 824. Storage subsystem 818 may include non-transitory computer-readable storage media including storage media 822 and a system memory 810.

Bus subsystem 802 provides a mechanism for letting the various components and subsystems of computer system 800 communicate with each other as intended. Although bus subsystem 802 is shown schematically as a single bus, alternative examples of the bus subsystem may utilize multiple buses. Bus subsystem 802 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

Processing subsystem 804 controls the operation of computer system 800 and may comprise one or more processors, application specific integrated circuits (ASICs), or field programmable gate arrays (FPGAs). The processors may include be single core or multicore processors. The processing resources of computer system 800 may be organized into one or more processing units 832, 834, etc. A processing unit may include one or more processors, one or more cores from the same or different processors, a combination of cores and processors, or other combinations of cores and processors. In some examples, processing subsystem 804 may include one or more special purpose co-processors such as graphics processors, digital signal processors (DSPs), or the like. In some examples, some or all of the processing units of processing subsystem may be implemented using customized circuits, such as application specific integrated circuits (ASICs), or field programmable gate arrays (FPGAs).

In some examples, the processing units in processing subsystem 804 may execute instructions stored in system memory 810 or on computer readable storage media 822. In various examples, the processing units may execute a variety of programs or code instructions and may maintain multiple concurrently executing programs or processes. At any given time, some or all of the program code to be executed may be resident in system memory 810 and/or on computer-readable storage media 822 including potentially on one or more storage devices. Through suitable programming, processing subsystem 804 may provide various functionalities described above. In instances where computer system 800 is executing one or more virtual machines, one or more processing units may be allocated to each virtual machine.

In certain examples, a processing acceleration unit 806 may optionally be provided for performing customized processing or for off-loading some of the processing performed by processing subsystem 804 so as to accelerate the overall processing performed by computer system 800. I/O subsystem 808 may include devices and mechanisms for inputting information to computer system 800 and/or for outputting information from or via computer system 800. In general, use of the term input device is intended to include all possible types of devices and mechanisms for inputting information to computer system 800. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 800 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 818 provides a repository or data store for storing information and data that is used by computer system 800. Storage subsystem 818 provides a tangible non-transitory computer-readable storage medium for storing the basic programming and data constructs that provide the functionality of some examples. Storage subsystem 818 may store software (e.g., programs, code modules, instructions) that when executed by processing subsystem 804 provides the functionality described above. The software may be executed by one or more processing units of processing subsystem 804. Storage subsystem 818 may also provide authentication in accordance with the teachings of this disclosure.

Storage subsystem 818 may include one or more non-transitory memory devices, including volatile and non-volatile memory devices. As shown in FIG. 8, storage subsystem 818 includes a system memory 810 and a computer-readable storage media 822. System memory 810 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 800, such as during start-up, may typically be stored in the ROM. The RAM typically contains data and/or program modules that are presently being operated and executed by processing subsystem 804. In some implementations, system memory 810 may include multiple different types of memory, such as static random access memory (SRAM), dynamic random access memory (DRAM), and the like.

By way of example, and not limitation, as depicted in FIG. 8, system memory 810 may load application programs 812 that are being executed, which may include various applications such as Web browsers, mid-tier applications, relational database management systems (RDBMS), etc., program data 814, and an operating system 816. By way of example, operating system 816 may include various versions of Microsoft Windows®, Apple Macintosh®, and/or Linux operating systems, a variety of commercially-available UNIX or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 822 may store programming and data constructs that provide the functionality of some examples. Computer-readable media 822 may provide storage of computer-readable instructions, data structures, program modules, and other data for computer system 800. Software (programs, code modules, instructions) that, when executed by processing subsystem 804 provides the functionality described above, may be stored in storage subsystem 818. By way of example, computer-readable storage media 822 may include non-volatile memory such as a hard disk drive, a magnetic disk drive, an optical disk drive such as a CD ROM, DVD, a Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain examples, storage subsystem 818 may also include a computer-readable storage media reader 820 that may further be connected to computer-readable storage media 822. Reader 820 may receive and be configured to read data from a memory device such as a disk, a flash drive, etc.

In certain examples, computer system 800 may support virtualization technologies, including but not limited to virtualization of processing and memory resources. For example, computer system 800 may provide support for executing one or more virtual machines. In certain examples, computer system 800 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 800. Accordingly, multiple operating systems may potentially be run concurrently by computer system 800.

Communications subsystem 824 provides an interface to other computer systems and networks. Communications subsystem 824 serves as an interface for receiving data from and transmitting data to other systems from computer system 800. For example, communications subsystem 824 may enable computer system 800 to establish a communication channel to one or more client devices via the Internet for receiving and sending information from and to the client devices. For example, when computer system 800 is used to implement bot system 120 depicted in FIG. 1, the communication subsystem may be used to communicate with a chatbot system selected for an application.

Communication subsystem 824 may support both wired and/or wireless communication protocols. In certain examples, communications subsystem 824 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some examples, communications subsystem 824 may provide wired network connectivity (e.g., Ethernet) in addition to or instead of a wireless interface.

Communication subsystem 824 may receive and transmit data in various forms. In some examples, in addition to other forms, communications subsystem 824 may receive input communications in the form of structured and/or unstructured data feeds 826, event streams 828, event updates 830, and the like. For example, communications subsystem 824 may be configured to receive (or send) data feeds 826 in real-time from users of social media networks and/or other communication services such as Twitter® feeds, Facebook® updates, web feeds such as Rich Site Summary (RSS) feeds, and/or real-time updates from one or more third party information sources.

In certain examples, communications subsystem 824 may be configured to receive data in the form of continuous data streams, which may include event streams 828 of real-time events and/or event updates 830, which may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 824 may also be configured to communicate data from computer system 800 to other computer systems or networks. The data may be communicated in various different forms such as structured and/or unstructured data feeds 826, event streams 828, event updates 830, and the like to one or more databases that may be in communication with one or more streaming data source computers coupled to computer system 800.

Computer system 800 may be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 800 depicted in FIG. 8 is intended only as a specific example. Many other configurations having more or fewer components than the system depicted in FIG. 8 are possible. Based on the disclosure and teachings provided herein, it should be appreciate there are other ways and/or methods to implement the various examples.

Although specific examples have been described, various modifications, alterations, alternative constructions, and equivalents are possible. Examples are not restricted to operation within certain specific data processing environments, but are free to operate within a plurality of data processing environments. Additionally, although certain examples have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described examples may be used individually or jointly.

Further, while certain examples have been described using a particular combination of hardware and software, it should be recognized that other combinations of hardware and software are also possible. Certain examples may be implemented only in hardware, or only in software, or using combinations thereof. The various processes described herein may be implemented on the same processor or different processors in any combination.

Where devices, systems, components or modules are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including but not limited to conventional techniques for inter-process communications, and different pairs of processes may use different techniques, or the same pair of processes may use different techniques at different times.

Specific details are given in this disclosure to provide a thorough understanding of the examples. However, examples may be practiced without these specific details. For example, well-known circuits, processes, algorithms, structures, and techniques have been shown without unnecessary detail in order to avoid obscuring the examples. This description provides example examples only, and is not intended to limit the scope, applicability, or configuration of other examples. Rather, the preceding description of the examples will provide those skilled in the art with an enabling description for implementing various examples. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific examples have been described, these are not intended to be limiting. Various modifications and equivalents are within the scope of the following claims.

In the foregoing specification, aspects of the disclosure are described with reference to specific examples thereof, but those skilled in the art will recognize that the disclosure is not limited thereto. Various features and aspects of the above-described disclosure may be used individually or jointly. Further, examples may be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate examples, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

While illustrative examples of the application have been described in detail herein, it is to be understood that the inventive concepts may be otherwise variously embodied and employed, and that the appended claims are intended to be construed to include such variations, except as limited by the prior art.

What is claimed:

1. A method comprising:
receiving, by a data processing system, a request to create a workspace to implement at least a portion of a model deployed in a production environment;
obtaining, by the data processing system, one or more data objects and associated metadata thereof relevant to the portion of the model;
obtaining, by the data processing system, an execution venue for the workspace;
generating, by the data processing system, a set of instructions for executing the one or more data objects and the associated metadata in the workspace;
creating, by the data processing system, the workspace within the execution venue, wherein the creating comprises instantiating the portion of the model, the one or more data objects, and the associated metadata in the workspace;
processing the portion of the model in the workspace using the one or more data objects and the associated metadata in accordance with the set of instructions; and
updating, by the data processing system, the production environment by:
obtaining an initial state of the production environment prior to creating the workspace within the execution venue, the initial state including a first output of the model deployed in the production environment;
replacing the portion of the model deployed in the production environment with the portion of the model processed in the workspace; and
generating, based on the replacing, an updated state of the production environment, the updated state including a second output of the model deployed in the production environment.

2. The method of claim 1, further comprising:
obtaining from one or more databases associated with the production environment, a plurality of data objects and a plurality of metadata, the one or more databases maintaining a mapping of models deployed in the production environment and associated data objects;
filtering the plurality of data objects and the plurality of metadata to obtain the one or more data objects and the associated metadata relevant to the portion of the model; and
performing iteratively, a set of lookup operations with respect to the one or more databases associated with the production environment to obtain at least one data object related to the one or more data objects.

3. The method of claim 1, wherein the execution venue is an area within an application instance within the production environment or a remote application instance.

4. The method of claim 1, further comprising:
receiving from a user, the request to execute the portion of the model in the workspace;
verifying whether the user is permitted to access the one or more data objects and the associated metadata thereof relevant to the portion of the model; and
generating, in response to a successful verification, a provisioning executable that creates the workspace within the execution venue.

5. The method of claim 1, wherein the workspace is further configured for
ingesting data from data sources that are external to the data processing system; and
creating at least one sandbox application or an analytical pipeline based on the portion of the model, and wherein the portion of the model in the workspace is processed using the at least one sandbox application or the analytical pipeline.

6. The method of claim 1, wherein the set of instructions is generated in a format that is transformable into an equivalent instruction set that can be executed in the execution venue hosting the workspace.

7. A computing device comprising:
a processor; and
a memory including instructions that, when executed with the processor, cause the computing device to, at least:
receive a request to create a workspace to implement at least a portion of a model deployed in a production environment;
obtain one or more data objects and associated metadata thereof relevant to the portion of the model;

obtain an execution venue for the workspace;
generate a set of instructions for executing the one or more data objects and the associated metadata in the workspace;
create the workspace within the execution venue by instantiating the portion of the model, the one or more data objects, and the associated metadata in the workspace;
process the portion of the model in the workspace using the one or more data objects and the associated metadata in accordance with the set of instructions; and
update the production environment by causing the computing device to:
obtain an initial state of the production environment prior to creating the workspace within the execution venue, the initial state including a first output of the model deployed in the production environment;
replace the portion of the model deployed in the production environment with the portion of the model processed in the workspace; and
generate based on the portion of the model being replaced, an updated state of the production environment, the updated state including a second output of the model deployed in the production environment.

8. The computing device of claim 7, wherein the processor is further configured to:
obtain from one or more databases associated with the production environment, a plurality of data objects and a plurality of metadata, the one or more databases maintaining a mapping of models deployed in the production environment and associated data objects;
filter the plurality of data objects and the plurality of metadata to obtain the one or more data objects and the associated metadata relevant to the portion of the model; and
perform iteratively, a set of lookup operations with respect to the one or more databases associated with the production environment to obtain at least one data object related to the one or more data objects.

9. The computing device of claim 7, wherein the execution venue is an area within an application instance within the production environment or a remote application instance.

10. The computing device of claim 7, wherein the processor is further configured to:
receive from a user, the request to execute the portion of the model in the workspace;
verify whether the user is permitted to access the one or more data objects and the associated metadata thereof relevant to the portion of the model; and
generate, in response to a successful verification, a provisioning executable that creates the workspace within the execution venue.

11. The computing device of claim 7, wherein the workspace is further configured to
ingest data from external data sources; and
create at least one sandbox application or an analytical pipeline based on the portion of the model, and wherein the portion of the model in the workspace is processed using the at least one sandbox application or the analytical pipeline.

12. The computing device of claim 7, wherein the set of instructions is generated in a format that is transformable into an equivalent instruction set that can be executed in the execution venue hosting the workspace.

13. A non-transitory computer readable medium storing specific computer-executable instructions that, when executed by a processor, cause a computer system to at least:
receive a request to create a workspace to implement at least a portion of a model deployed in a production environment;
obtain one or more data objects and associated metadata thereof relevant to the portion of the model;
obtain an execution venue for the workspace;
generate a set of instructions for executing the one or more data objects and the associated metadata in the workspace;
create the workspace within the execution venue by instantiating the portion of the model, the one or more data objects, and the associated metadata in the workspace;
process the portion of the model in the workspace using the one or more data objects and the associated metadata in accordance with the set of instructions; and
update the production environment by causing the computer system to:
obtain an initial state of the production environment prior to creating the workspace within the execution venue, the initial state including a first output of the model deployed in the production environment;
replace the portion of the model deployed in the production environment with the portion of the model processed in the workspace; and
generate based on the portion of the model being replaced, an updated state of the production environment, the updated state including a second output of the model deployed in the production environment.

14. The non-transitory computer readable medium of claim 13, wherein the computer system is further configured to:
obtain from one or more databases associated with the production environment, a plurality of data objects and a plurality of metadata, the one or more databases maintaining a mapping of models deployed in the production environment and associated data objects;
filter the plurality of data objects and the plurality of metadata to obtain the one or more data objects and the associated metadata relevant to the portion of the model; and
perform iteratively, a set of lookup operations with respect to the one or more databases associated with the production environment to obtain at least one data object related to the one or more data objects.

15. The non-transitory computer readable medium of claim 13, wherein the execution venue is an area within an application instance within the production environment or a remote application instance.

16. The non-transitory computer readable medium of claim 13, wherein the computer system is further configured to:
receive from a user, the request to execute the portion of the model in the workspace;
verify whether the user is permitted to access the one or more data objects and the associated metadata thereof relevant to the portion of the model; and
generate, in response to a successful verification, a provisioning executable that creates the workspace within the execution venue.

17. The non-transitory computer readable medium of claim 13, wherein the computer system is further configured to:
   ingest data from external data sources; and
   create at least one sandbox application or an analytical pipeline based on the portion of the model, and wherein the portion of the model in the workspace is processed using the at least one sandbox application or the analytical pipeline.

\* \* \* \* \*